US012558857B2

(12) United States Patent
Coupe et al.

(10) Patent No.: US 12,558,857 B2
(45) Date of Patent: Feb. 24, 2026

(54) FAN BLADE OR VANE WITH CROSS-SHAPED OR STAR-SHAPED COMPOSITE ROOT

(71) Applicant: SAFRAN, Paris (FR)

(72) Inventors: Dominique Marie Christian Coupe, Moissy Cramayel (FR); Pierre Jean Faivre D'Arcier, Moissy Cramayel (FR); Marc-Antoine André Louis Colot, Moissy Cramayel (FR); Enrico Giovanni Obert, Moissy Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/860,280

(22) PCT Filed: Apr. 25, 2023

(86) PCT No.: PCT/FR2023/000053
§ 371 (c)(1),
(2) Date: Oct. 25, 2024

(87) PCT Pub. No.: WO2023/209288
PCT Pub. Date: Nov. 2, 2023

(65) Prior Publication Data
US 2025/0282106 A1 Sep. 11, 2025

(30) Foreign Application Priority Data

Apr. 26, 2022 (FR) ........................................ 2203865

(51) Int. Cl.
B29C 70/24 (2006.01)
F01D 5/30 (2006.01)
(Continued)

(52) U.S. Cl.
CPC ................ B29C 70/24 (2013.01); F01D 5/30 (2013.01); B29C 70/48 (2013.01);
(Continued)

(58) Field of Classification Search
CPC ....... B29C 70/24; B29C 70/48; B29C 70/222; B29C 70/443; B64C 11/04; B64C 11/26;
(Continued)

(56) References Cited

U.S. PATENT DOCUMENTS 4,648,921 A * 3/1987 Nutter, Jr. ............... B29C 70/46
29/889.6
2006/0257260 A1 11/2006 Dambrine et al.
(Continued)

FOREIGN PATENT DOCUMENTS

FR 2 732 406 A1 10/1996
WO WO 2006/136755 A2 12/2006

OTHER PUBLICATIONS

International Search Report as issued in International Patent Application No. PCT/FR2023/000053, dated Jul. 26, 2023.

*Primary Examiner* — Nathaniel E Wiehe
*Assistant Examiner* — Maxime M Adjagbe
(74) *Attorney, Agent, or Firm* — Pillsbury Winthrop Shaw Pittman LLP

(57) ABSTRACT

A turboprop engine blade or propeller airfoil made of composite material includes a fiber reinforcement densified by a matrix, the blade or propeller airfoil including, along a span direction, a root and an aerodynamic profile. The fiber reinforcement includes a fiber preform having a three-dimensional weave with a root preform part located in the root and an aerodynamic profile part located in the aerodynamic profile, the root preform and aerodynamic profile preform parts being connected to one another by three-dimensional weaving. The root includes a plurality of (Continued)

branches. The root preform part of the fiber preform includes a plurality of branches each extending in a branch of the root.

11 Claims, 9 Drawing Sheets

(51) Int. Cl.
   *B29C 70/48*          (2006.01)
   *B29L 31/08*          (2006.01)

(52) U.S. Cl.
   CPC ... *B29L 2031/082* (2013.01); *B29L 2031/087* (2013.01); *F05D 2230/20* (2013.01)

(58) Field of Classification Search
   CPC . B64C 11/16; B64C 11/18; F01D 5/30; B29L 2031/082; B29L 2031/087
   See application file for complete search history.

(56)                  References Cited

U.S. PATENT DOCUMENTS

2013/0017093 A1*   1/2013   Coupe ..................... B29B 11/16
                                                            416/230
2016/0159460 A1*   6/2016   Laurenceau ....... B29D 99/0025
                                                            264/103
2016/0245103 A1    8/2016   Gimat et al.
2019/0217943 A1    7/2019   Courtier

* cited by examiner

[Fig. 1]
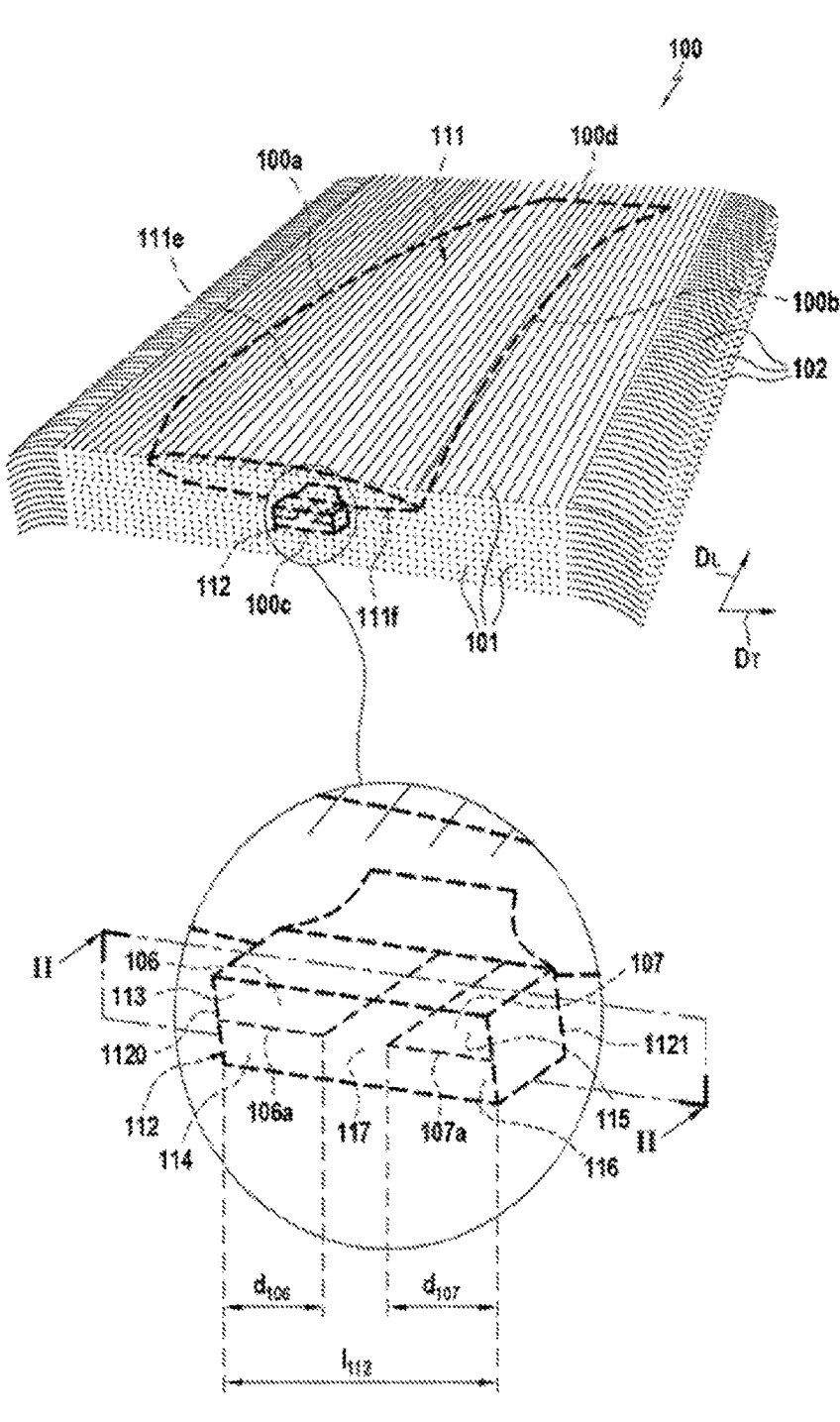

[Fig. 2]
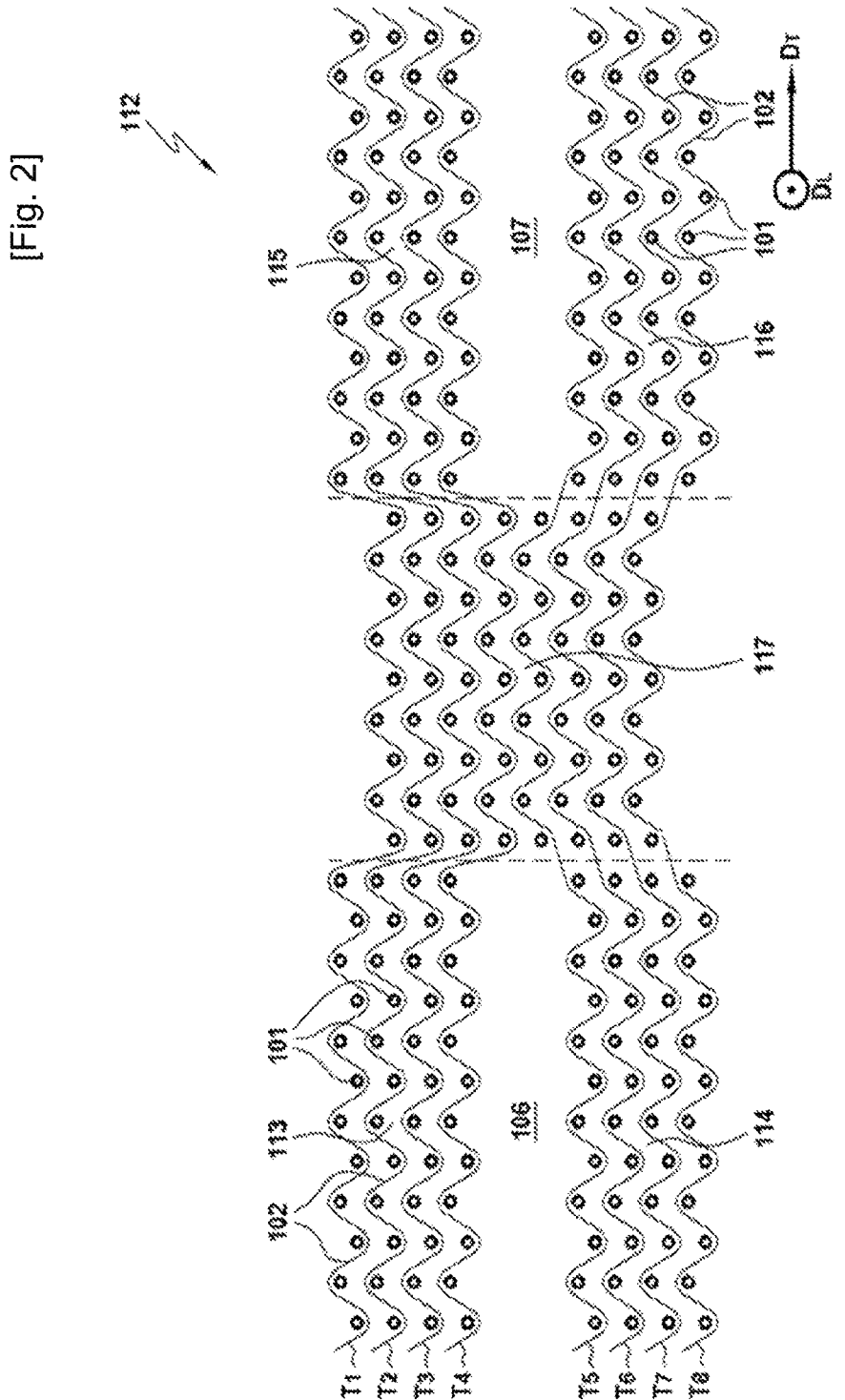

[Fig. 3]
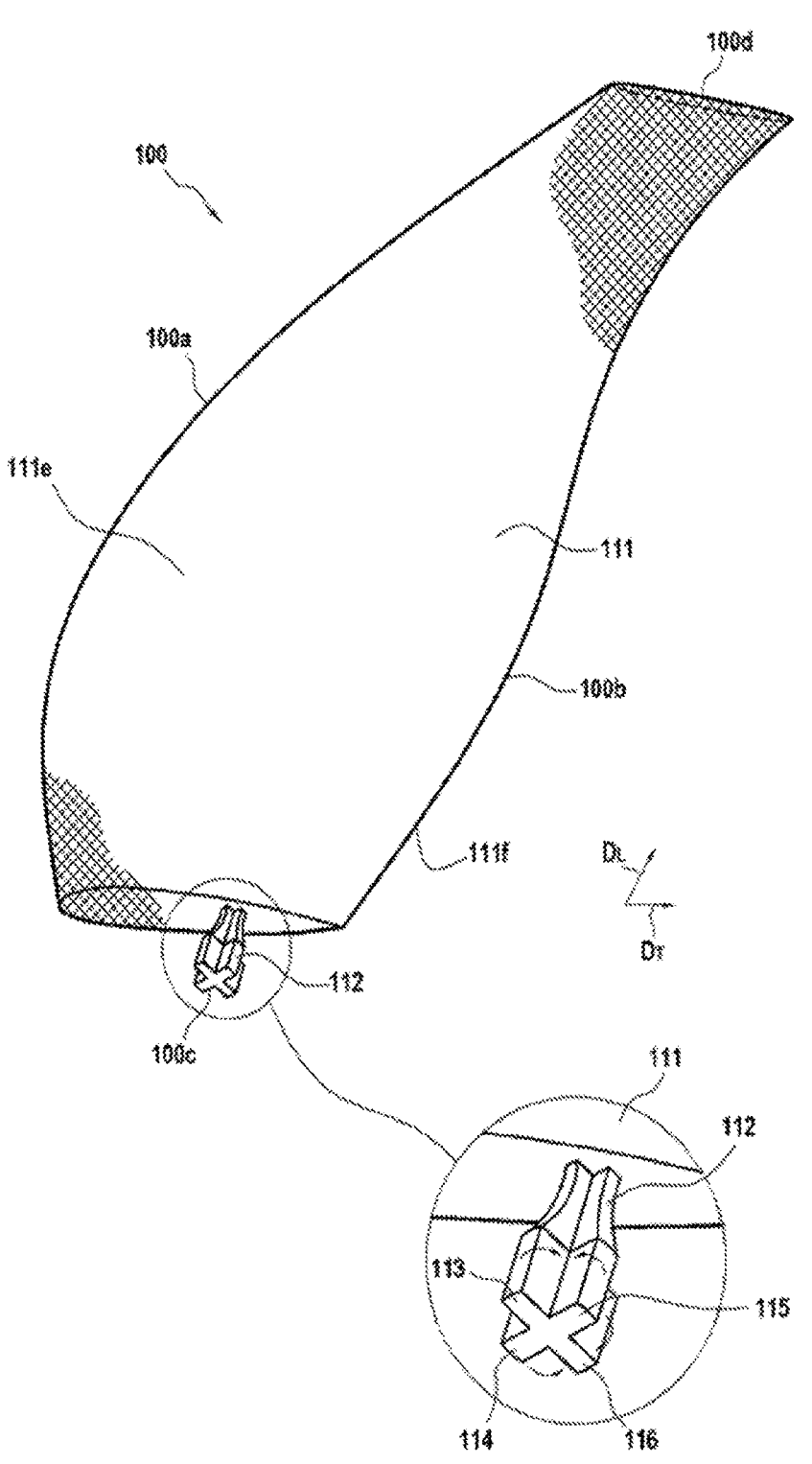

[Fig. 4]
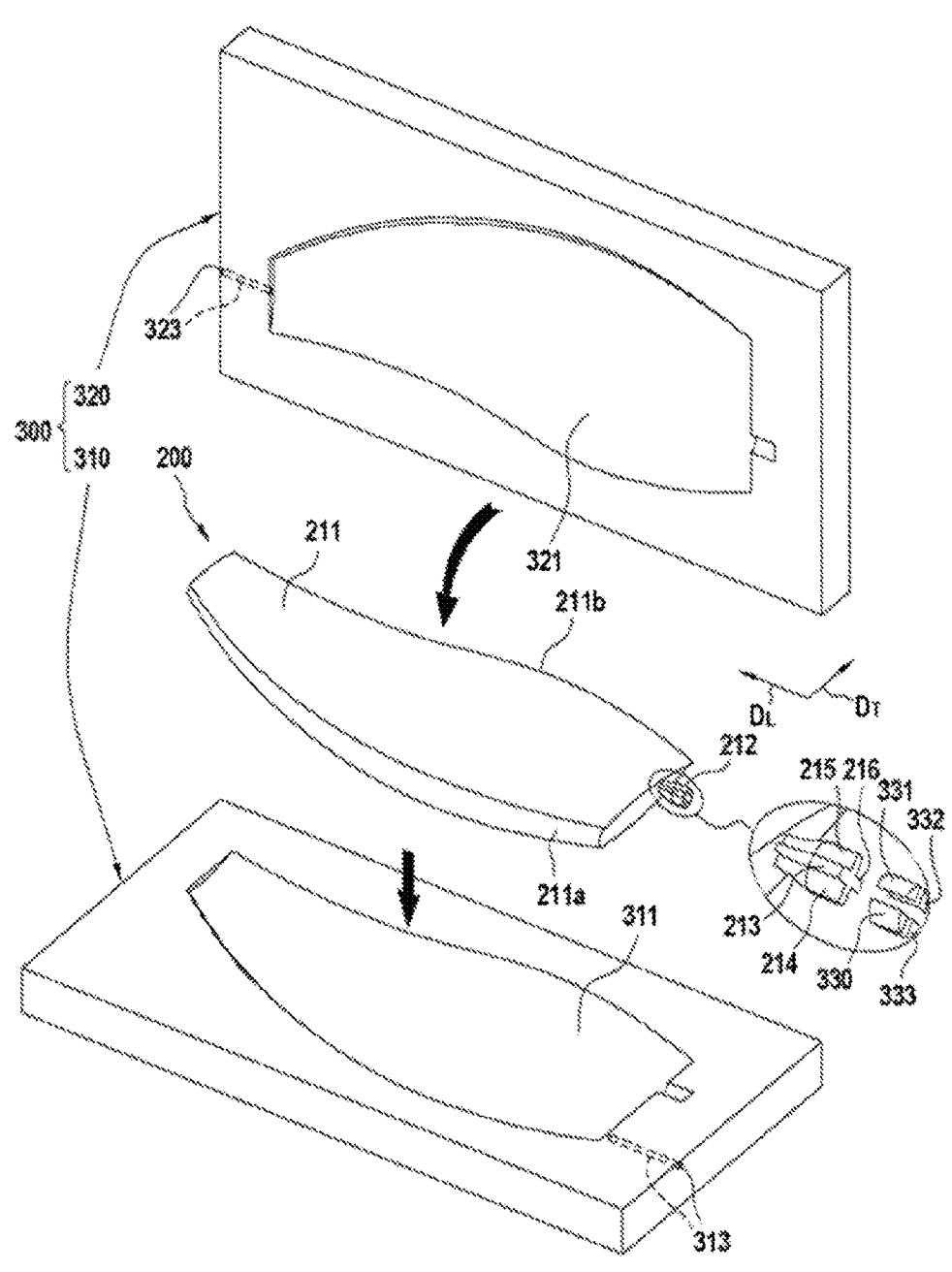

[Fig. 5]
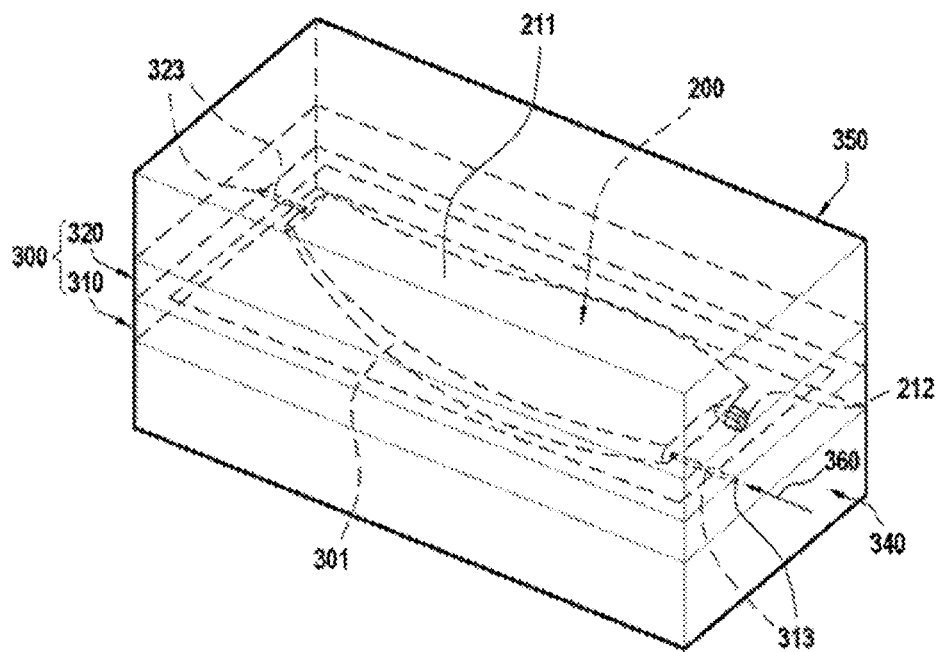

[Fig. 6]
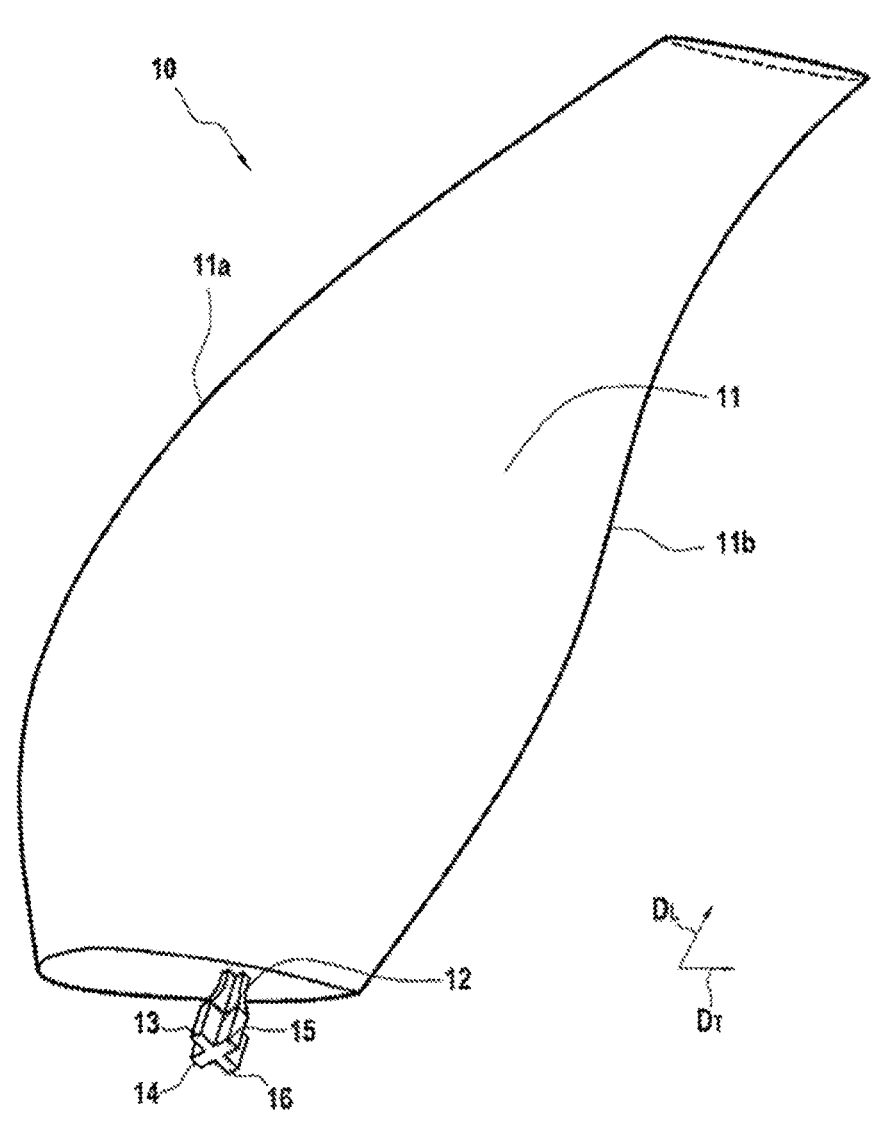

[Fig. 7]
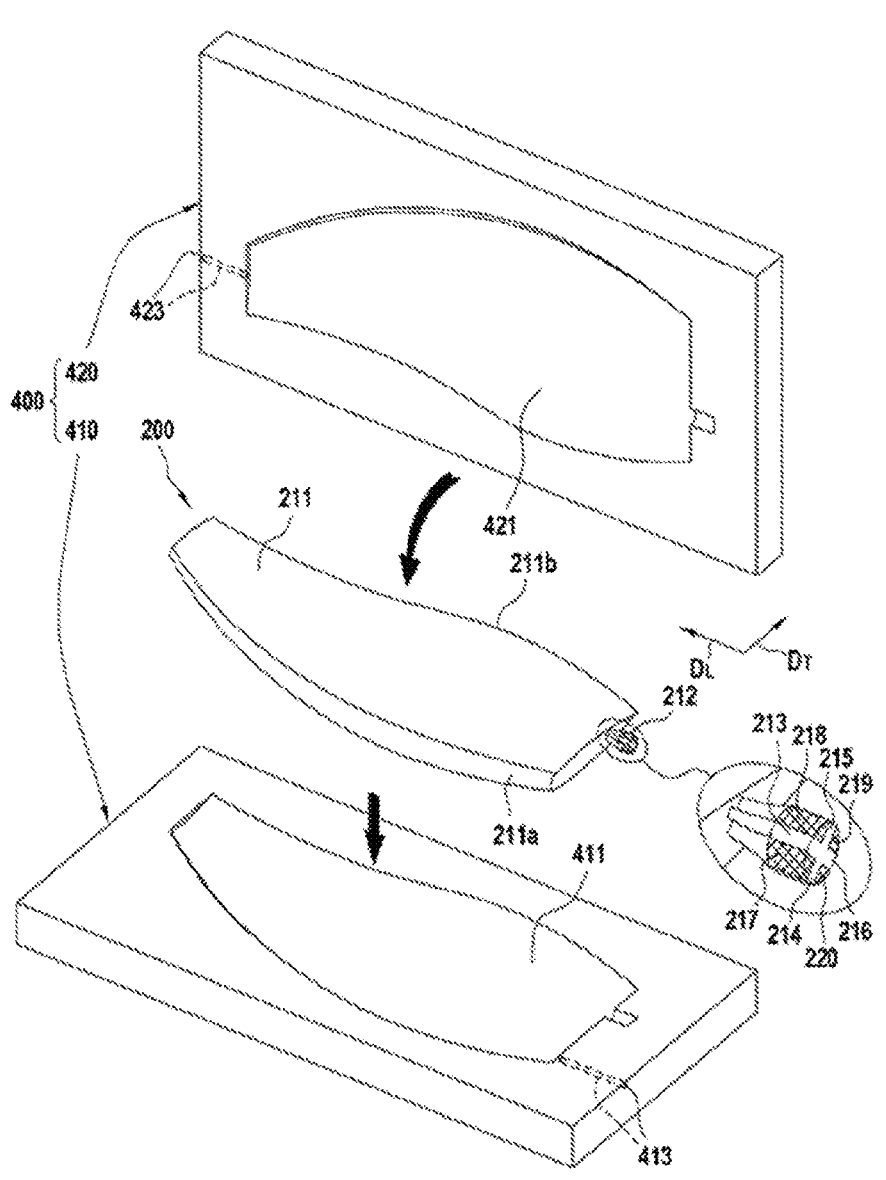

[Fig. 8]
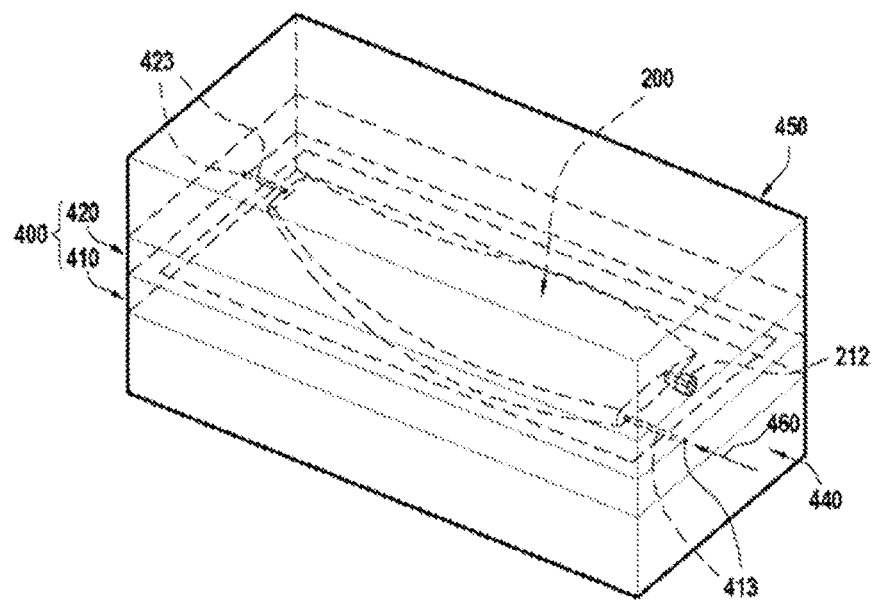

[Fig. 9]
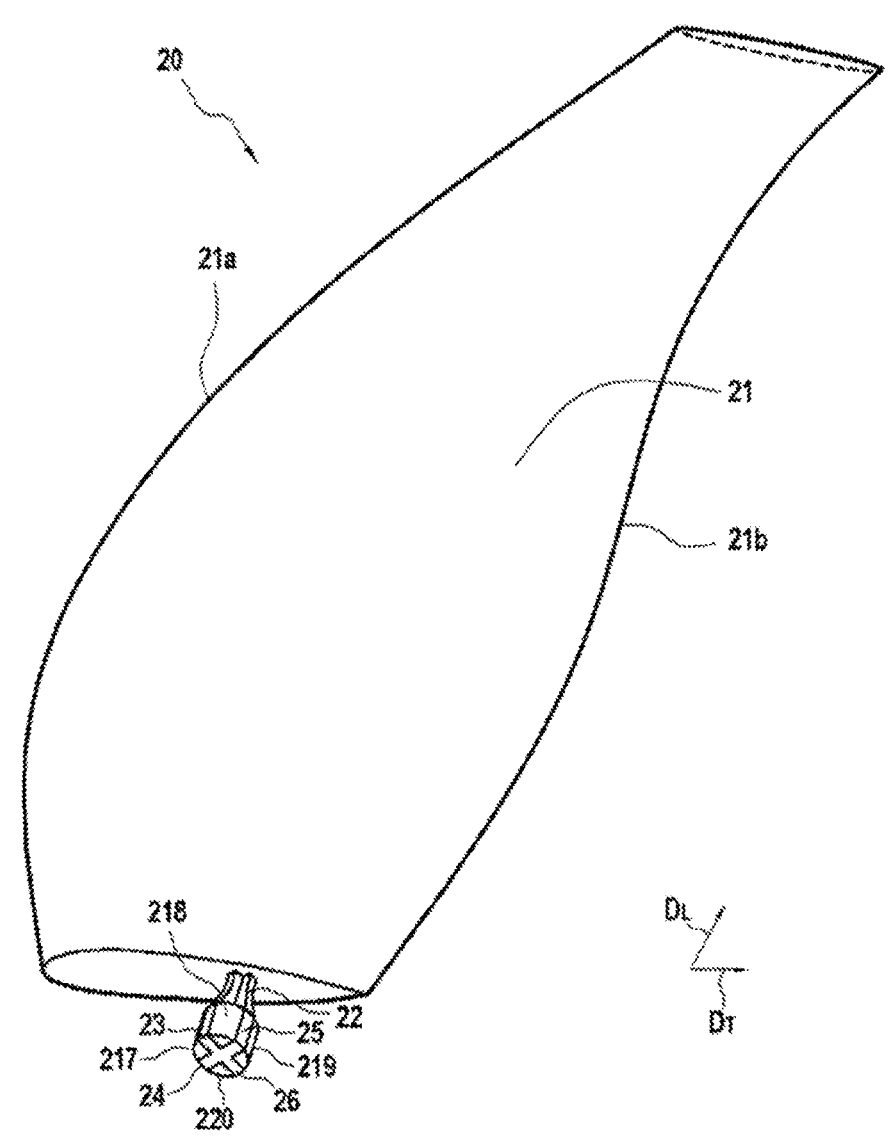

FAN BLADE OR VANE WITH CROSS-SHAPED OR STAR-SHAPED COMPOSITE ROOT

CROSS-REFERENCE TO RELATED APPLICATIONS

This application is the U.S. National Stage of PCT/FR2023/000053, filed Apr. 25, 2023, which in turn claims priority to French patent application number 22 03865 filed Apr. 26, 2022. The content of these applications are incorporated herein by reference in their entireties.

TECHNICAL FIELD

This invention relates to the field of aircraft blades or propeller airfoils such as those found on turboprop engines.

PRIOR ART

Blades or airfoils for turboprop engines are generally made of metallic material. While blades or propeller airfoils made of metallic material have good mechanical resistance, they have the drawback of having a relatively large mass.

To obtain lighter blades or propeller airfoils, it is known to produce propeller airfoils made of composite material, i.e. by producing structural parts with fiber reinforcements densified by a matrix.

Document US 2013/0017093 describes the production of a propeller airfoil based on a fiber structure with an aerodynamic profile into which a part of a spur is inserted, one end of the spur being extended by an inflated portion intended to form the root of the propeller airfoil.

The new generation of engines require more compact blade or airfoil roots. This requirement stems from the need to be able to pivot the blade or the airfoil about its vertical axis to adapt its incidence to the flight rating (variable-pitch blade or airfoil). This need, combined with the fact that the blade or airfoil must be incorporated as low as possible on the disc, makes it possible to greatly reduce the bulk of the root.

For this purpose, the roots of new-generation blades or airfoils have an axisymmetric or substantially axisymmetric shape and reduced dimensions, unlike the roots of the prior art such as those described in document US 2013/0017093 which extend over the entire length of the lower part of the blade or airfoil.

This axisymmetric or quasi-axisymmetric shape is more difficult to manufacture as a composite material, in particular when three-dimensional (3D) weaving is used to form the fiber reinforcement of the blade or airfoil.

Moreover, the mechanical loads to which new-generation roots are subjected impose additional stresses. Specifically, besides the mechanical tensile and bending loads usually encountered (caused by centrifugal forces and impacts with objects respectively), new-generation roots can be incorporated into the rotor disc using metallic shells, which causes an additional mechanical circumferential compression load.

SUMMARY OF THE INVENTION

It is therefore desirable to be able to make provision for a solution for the production of aircraft blades or propeller airfoils made of composite materials with a compact root and able to resist the different mechanical loads.

For this purpose, this invention makes provision for a method for manufacturing a turboprop engine blade or propeller airfoil made of composite material comprising a fiber reinforcement densified by a matrix, the method comprising:

the production by three-dimensional (3D) weaving of a fiber blank made as a single piece, the fiber blank having a flat shape extending along a longitudinal direction and a transverse direction respectively corresponding to the span direction and to the chord direction of the blade or propeller airfoil to be manufactured, the fiber blank comprising a root part and an aerodynamic profile part extending along the longitudinal direction from its root part and along the transverse direction between a leading edge portion and a trailing edge portion, the shaping of the fiber blank to obtain a fiber preform as a single piece having said aerodynamic profile part forming an aerodynamic profile preform part and said root part forming a root preform part, and the densification of the preform by a matrix to obtain a blade or propeller airfoil made of composite material having a fiber reinforcement consisting of the fiber preform and densified by the matrix, and forming a single piece with an integrated root, characterized in that the root part of the fiber blank comprises several non-interlinkings extending along a plane parallel to the surface of the fiber blank, each interlinking extends in the transverse direction from an edge of the root part of the fiber blank and over a distance less than half of the width of the root part, each non-interlinking separating two woven portions in the fiber blank and in that the shaping of the fiber blank comprises the orientation in different directions of the woven portions separated by the non-interlinkings in such a way as to form a root preform part including a plurality of branches.

The method of the invention thus makes it possible to produce a propeller airfoil or blade with a composite root which is at once compact and perfectly suitable for resisting the different mechanical loads previously described. Specifically, the fiber reinforcement part of the root is made using 3D weaving and includes a plurality of branches which are connected to the fiber reinforcement part of the aerodynamic profile at its center. Consequently, the bulk of the root is determined mainly by the length of the branches, which makes it possible to obtain a much more compact composite root than that of the prior art which generally extends over the entire width of the lower part of the aerodynamic profile. In each branch, there are yarns, for example warp yarns, oriented in the span direction of the airfoil or blade, which gives this airfoil or blade a good mechanical tensile and bending resistance when combined with 3D weaving.

Moreover, the branch shape makes it possible to obtain a root having an axisymmetric or quasi-axisymmetric shape compatible with incorporation into a propeller rotation or pitch change system.

By thus producing a fiber reinforcement in which a root part is integrally formed, i.e. woven as a single piece, with an aerodynamic profile part, a very good mechanical withstand is ensured in the whole piece and, in particular, at the connection between the root and the aerodynamic profile.

According to an embodiment of the method of the invention, the densification of the fiber preform comprises the placing of the preform in an injection tool having the shape of the blade or propeller airfoil to be manufactured, removable insertion elements being placed between the branches of the root preform part, the densification further comprising the injection of a resin into the fiber preform held in the injection tool, the transformation of the resin into a matrix by heat treatment and the unmolding of the blade or propeller airfoil, the unmolding comprising the removal of the insertion elements in such a way as to obtain a root with a plurality of branches.

According to an embodiment of the method of the invention, the densification of the fiber preform comprises the placing of the preform in an injection tool having the shape of the blade or propeller airfoil to be manufactured, filling elements being placed between the branches of the root preform part, the densification further comprising the injection of a resin into the fiber preform held in the injection tool, the transformation of the resin into a matrix by heat treatment and the unmolding of the blade or propeller airfoil in such a way as to obtain a root comprising a skeleton including a plurality of branches with the filling elements bonded to said branches. The filling elements make it possible to reinforce the mechanical resistance to circumferential compression.

According to an aspect of the method of the invention, the filling elements are composed of a fiber material chosen from among one of the following fiber materials: three-dimensional weaves, unidirectional laminates and fiber mat.

According to an aspect of the method of the invention, the filling elements are made of metallic material.

The invention also has as subject a turboprop engine blade or propeller airfoil made of composite material comprising a fiber reinforcement densified by a matrix, the blade or propeller airfoil including, along a span direction, a root and an aerodynamic profile, the fiber reinforcement comprising a fiber preform having a three-dimensional weave with a root preform part located in the root and an aerodynamic profile preform part located in the aerodynamic profile, the root and aerodynamic profile preform parts being connected to one another by three-dimensional weaving, characterized in that the root includes a plurality of branches and in that the root preform part of the fiber preform comprises a plurality of branches each extending in one branch of the root.

The invention also has as subject a turboprop engine blade or propeller airfoil made of composite material comprising a fiber reinforcement densified by a matrix, the blade or propeller airfoil including, along a span direction, a root and an aerodynamic profile, the fiber reinforcement comprising a fiber preform having a three-dimensional weave with a root preform part located in the root and an aerodynamic profile preform part located in the aerodynamic profile, the root and aerodynamic profile preform parts being connected to one another by three-dimensional weaving, characterized in that the root has a bulb shape, said root comprising a skeleton including a plurality of branches and in that the root preform part of the fiber preform comprises a plurality of branches each extending in one branch of the skeleton of the root.

According to an aspect of the blade or propeller airfoil of the invention, the filling elements are composed of a fiber material chosen from among one of the following fiber materials: three-dimensional weaves, unidirectional laminates and fiber mat.

According to another aspect of the blade or propeller airfoil of the invention, the filling elements are made of metallic material.

The invention furthermore covers an aeronautical engine comprising a plurality of blades or propeller airfoils according to the invention along with an aircraft comprising at least one such engine.

BRIEF DESCRIPTION OF THE DRAWINGS

FIG. 1 is a schematic view illustrating the 3D weaving of a fiber blank for manufacturing a blade, FIG. 2 is a weft-direction section view on a magnified scale of an assembly of layers of yarns showing the formation of two non-interlinkings in the root part of the blank of FIG. 1 along a section plane II-II, FIG. 3 is a perspective view showing the shaping of a root preform part in the fiber blank of FIG. 1, FIG. 4 is an exploded schematic perspective view showing an injection tool and the placing of the fiber preform of FIG. 3 inside it in accordance with an embodiment of the invention, FIG. 5 is a perspective schematic view showing the injection tool of FIG. 4 closed, FIG. 6 is a perspective schematic view of a blade made of composite material obtained in accordance with an embodiment of the invention.

FIG. 7 is an exploded perspective schematic view showing an injection tool and the placing of the fiber preform of FIG. 3 inside it in accordance with another embodiment of the invention.

FIG. 8 is a perspective schematic view showing the injection tool of FIG. 7 closed.

FIG. 9 is a perspective schematic view of a blade made of composite material obtained in accordance with another embodiment of the invention.

DESCRIPTION OF THE EMBODIMENTS

The invention is generally applicable to different types of blades or propeller airfoils used in aircraft engines. The invention has an advantageous but non-exclusive application in blades or propeller airfoils of large dimensions which are intended to be incorporated into pivot or variable-pitch systems. Such blades or propeller airfoils are generally equipped with a root having both a small bulk (compact shape) and a good resistance to tensile, bending and circumferential compression forces. The blade according to the invention can in particular form a blade for ducted impellers such as fan blades or a blade for unducted impellers as in "open rotor" aeronautical engines.

In the remainder of the description, the exemplary embodiments are described in relation to blades for turboprop engines. However, the exemplary embodiments are also applicable to propeller airfoils for aircraft.

FIG. 1 very schematically represents a fiber blank 100 intended to shape the fiber preform of a blade to be produced.

The fiber structure blank 100 is obtained, as schematically illustrated on FIG. 1, by three-dimensional (3D) weaving done in a known manner by means of a Jacquard loom on which has been arranged a bundle of warp yarns 101 or strands made of a plurality of layers of several hundred yarns each, the warp yarns being connected by weft yarns 102. The fiber structure blank 100 is woven as a single piece, the blank extending in a longitudinal direction $D_L$, corresponding to the span direction of the blade to be manufactured, between a lower part 100c and an upper part 100d, and in a transverse direction $D_T$, corresponding to the chord direction of the blade to be manufactured between a front edge 100a and a rear edge 100b, the blank comprising an aerodynamic profile part 111 defining two faces 111e and 111f intended to respectively form the suction and pressure faces of the blade and a root part 112 intended to subsequently form a blade root and extending outside the aerodynamic profile blank

111 along the longitudinal direction $D_L$ and in recess from the front and rear edges 100a and 100b along the transverse direction $D_T$.

In the illustrated example, the 3D weaving is weaving with an "interlock" weave. The term "interlock" weave should here be understood to mean a weave in which each layer of weft yarns links several layers of warp yarns with all of the yarns in the same weft column having the same movement in the weave plane.

Other known types of three-dimensional weaving may be used, such as in particular those described in document WO 2006/136755, the contents of which are included here by way of reference. This document in particular describes the production by weaving, as a single piece, of fiber reinforcement structures for pieces such as blades having a first type of weave at the core and a second type of weave at the skin, making it possible to give this type of piece both the desired mechanical and aerodynamic properties.

The fiber blank according to the invention can in particular be woven from carbon or ceramic fiber yarns such as silicon carbide.

Gradually as the fiber blank of varying thickness and width is woven, a certain number of warp yarns are not woven, which makes it possible to define the desired contour and thickness, continuously variable, of the blank 100. An example of variable 3D weaving in particular making it possible to vary the thickness of the blank between a first edge intended to form the leading edge and a second edge of a lesser thickness and intended to form the trailing edge is described in the document US 2006/257260.

In accordance with the invention, during the weaving, two non-interlinkings 106 and 107 are made inside the root part 112 of the fiber blank 100 between two successive layers of warp yarns. The non-interlinking 106 extends along a plane parallel to the surface of the fiber blank and over a non-interlinked area delimited by a contour 106a locally separating the root part 112 into two woven portions 113 and 114. Similarly, the non-interlinking 107 extends in a plane parallel to the surface of the fiber blank and over a non-interlinked area delimited by a contour 107a locally separating the root part 112 into two woven portions 115 and 116. Moreover, the non-interlinking 106 extends in the transverse direction from a first lateral edge 1120 of the root part 112 and over a distance $d_{106}$ of less than half of the width $l_{112}$ of the root part 112 while the non-interlinking 107 extends in the transverse direction from a second lateral edge 1121 of the root part 112 and over a distance $d_{107}$ of less than half of the width $l_{112}$ of the root part 112. A non-interlinked area 117, i.e. an area in which the blank is 3D-woven over its entire thickness, is thus present in the root part 112 between the two non-interlinkings 106 and 107.

A mode of 3D weaving of the blank 100 using an interlock weave is schematically represented by FIG. 2. FIG. 2 is a magnified partial view of a warp section plane in the root part 112 of the blank 100 including the non-interlinkings 106 and 107 (section II-II on FIG. 1). In this example, the blank 100 comprises eight layers of warp yarns 101 extending substantially in the longitudinal direction $D_L$. On FIG. 2, the 8 layers of warp yarns are linked by weft yarns $T_1$ to $T_8$ in the non-interlinked area 117, the weft yarns extending substantially in the transverse direction $D_T$. At the level of the non-interlinking 106, the woven portion 113 comprises 4 layers of warp yarns 101 interlinked by 4 weft yarns $T_1$ to $T_4$ while the woven portion 114 comprises four layers of warp yarns interlinked by four weft yarns $T_5$ and $T_8$. Similarly, at the level of the non-interlinking 107, the woven portion 115 comprises four layers of warp yarns 101 interlinked by 4 weft yarns $T_1$ to $T_4$ while the woven portion 116 comprises 4 layers of warp yarns interlinked by 4 weft yarns $T_5$ and $T_8$.

In other words, the fact that the weft yarns $T_1$ to $T_4$ do not extend into the layers of warp yarns of the woven portions 114 and 116 and the weft yarns $T_5$ to $T_8$ do not extend into the layers of warp yarns of the woven portions 113 and 115 ensures the non-interlinkings 106 and 107 which separate the woven portions 113 and 114, on the one hand, and the woven portions 115 and 116 on the other.

Once the weaving is finished, the unwoven yarns located around the fiber blank 100 are cut to extract the blank, then the shaping of the root part of the blank is carried out. In the example described here, the shaping of the root part 112 is done by unfolding the woven portions 113 to 116 in different directions as illustrated on FIG. 3. In general, the woven portions non-interlinked to one another in the root part are deployed in different directions in order to form an axisymmetric or quasi-axisymmetric root skeleton, for example but without limitation in a cross or star shape.

One thus obtains a fiber preform 200 comprising along the longitudinal direction $D_L$ an aerodynamic profile preform part 211 and a root preform part 212 having, in the example described here, a cross or star shape with four branches 213 to 216 as shown on FIG. 4. The aerodynamic profile preform part 211 extends along the transverse direction DT between a leading edge part 211a and a trailing edge part 211b. The number of branches may vary. The root part of the blank can for example comprise 4 non-interlinkings in order to obtain a root preform part with six branches. In general, the branches of the root preform part extend in a plane parallel to the transverse direction $D_T$.

The densification of the fiber preform is then carried out. The densification of the fiber preform intended to form the fiber reinforcement of the piece to be manufactured consists in filling the voids of the preform, in all or part of the volume of that preform, with the material constituting the matrix. This densification is done in a manner known per se following the liquid technique (CVL). The liquid technique consists in impregnating the preform with a liquid blend containing a precursor of the material of the matrix. The precursor usually takes the form of a polymer, such as a high-performance epoxy resin, where applicable diluted in a solvent. The preform is placed in a mold that can be closed in a sealed manner with a housing having the shape of the molded final part. Next, the mold is closed again and the liquid matrix precursor (for example a resin) is injected into the entire housing to pre-impregnate the entire fiber part of the preform.

The transformation of the matrix precursor, namely its polymerization, is done by heat treatment, generally by heating the mold, after eliminating any solvent and crosslinking the polymer, the preform still being kept in the mold with a shape equivalent to that of the piece to be produced.

If forming a carbon or ceramic matrix, the heat treatment consists in pyrolyzing the precursor to transform the matrix into a carbon or ceramic matrix according to the precursor used and the pyrolysis conditions. By way of example, ceramic liquid precursors, particularly of SiC, can be resins of polycarbosilane (PCS) or polytitanocarbosilane (PTCS) or polysilazane (PSZ) type, while carbon liquid precursors can be resins with relatively high coke rates, such as phenol resins. Several consecutive cycles, from impregnation to heat treatment, can be carried out to achieve the desired degree of densification.

According to an aspect of the invention, particularly if forming an organic matrix, the densification of the fiber preform can be done via the well-known step of RTM (Resin Transfer Molding). In accordance with the RTM method, the fiber preform is placed in a mold having the outer shape of the piece to be produced. A thermosetting resin is injected into the inner space of the mold comprising the fiber preform. A pressure gradient is generally established in this inner space between the place where the resin is injected and the evacuation orifices of this latter in order to control and optimize the impregnation of the preform by the resin.

As illustrated in FIG. 4, the injection of a liquid matrix precursor blend into the fiber texture along with its transformation into a matrix are here done in an injection tool 300 which comprises a first shell 310 comprising at its center a first cavity 311 corresponding in part to the shape and dimensions of the blade to be produced and a second shell 320 comprising at its center a second cavity 321 corresponding in part to the shape and dimensions of the blade to be produced.

According to a first exemplary embodiment, removable insertion elements 330 to 333 are placed between the branches 213 to 216 of the root preform part 212. The removable insertion elements can be made, in particular, of resin, of soluble salt core or of metal.

Once the tool 300 is closed as illustrated on FIG. 5, the first and second cavities 311 and 321, of the first and second shells 310 and 320 respectively, together define an inner volume 301 having the shape of the blade to be produced and in which the fiber preform 200 is placed. The fiber preform 200 can be compacted with the closing of the tool 300 in order to obtain a determined fiber content in the preform. In this case, a compaction pressure is applied to the shells 310 and 320, for example by means of a press. The compaction of the fiber preform can also be done in a separate tool before the introduction of the preform into the injection tool.

The tool 300 further comprises means for performing the injection of a liquid matrix precursor and the transformation of this precursor into a matrix. More precisely, in the example described here, the first shell 310 of the tool 300 comprises an injection port 313 intended to allow the injection of a liquid matrix precursor blend into the fiber preform while the second shell comprises an evacuation port 323 intended to interact with a pumping system for vacuuming the tool and drawing in air during the injection. The injection tool 300 also comprises a lower part 340 and an upper part 350 between which the first and second shells 310 and 320 are placed, the lower part 340 and the upper part 350 being equipped with heating means (not shown on FIG. 5).

Once the tool 300 is closed, the blade is molded by impregnating the preform 200 with a thermosetting resin that is polymerized by heat treatment. For this purpose the well-known process of injection or transfer molding, so-called RTM (Resin Transfer Molding) is used. In accordance with the RTM process, a resin 360, for example a thermosetting resin, is injected via the injection port 313 of the first shell 310 into the internal volume occupied by the preform 200. The port 323 of the second shell 320 is connected to an evacuation duct kept under pressure (not shown on FIG. 5). This configuration allows the establishment of a pressure gradient between the lower part of the preform 200 where the resin is injected and the upper part of the preform located near the port 323. In this way, the resin 360 injected substantially level with the lower part of the preform will gradually impregnate the whole preform by circulating through it all the way to the evacuation port 323 through which the surplus is evacuated. Of course, the first and second shells 310 and 320 of the tool 300 may respectively comprise several injection ports and several evacuation ports.

The resin used can, for example, be an epoxy resin of 180° C. temperature class (maximum temperature withstood with no loss of characteristics). Resins suitable for the RTM process are well known. They preferably have low viscosity to facilitate their injection into the fibers. The choice of the temperature class and/or chemical nature of the resin is determined according to the thermomechanical stresses to which the part is to be subjected. Once the resin is injected into the entire reinforcement, it is polymerized by heat treatment as per the RTM process.

After injection and polymerization, the blade is unmolded. The insertion elements 330 to 333 are then removed in such a way as to obtain a blade root including a plurality of branches. Finally, the blade is trimmed to remove excess resin and the chamfers are machined. No other machining is necessary since the part, being molded, complies with the required dimensions.

The densification methods described above are used mainly to produce, from the fiber preform of the invention, blades or propeller airfoils made of organic matrix composite (OMC), carbon matrix (C/C) and ceramic matrix composite (CMC) material.

As illustrated on FIG. 6, a blade 10 is obtained, formed of a fiber reinforcement densified by a matrix which includes in its lower part a root 12 formed by the root preform part 212 of the fiber preform 200 and an airfoil 11 formed by the airfoil preform part 211 of the fiber preform 200. The blade 10 includes a leading edge 11a and a trailing edge 11b corresponding respectively to the leading edge 211a and trailing edge 211b parts of the fiber preform 200. The root 12 here has a cross or star shape with four branches 13 to 16 in which the branches 213 to 216 of the root preform part 212 respectively extend. The blade 10 thus comprises a root 12 which has a compact shape suitable for incorporation into a rotation or propeller pitch change system.

According to a particular feature, certain branches of the blade root can have a greater thickness and/or length than the others in order to adapt to the forces experienced by the blade.

According to another exemplary embodiment shown on FIG. 7, filling elements 217 to 220 are placed between the branches 213 to 216 of the root preform part 212 of the fiber preform 200. The filling elements 217 to 220 differ from the removable insertion elements 330 to 333 previously described in that they are intended to be kept in the final blade. The filling elements can be composed of a fiber material chosen from among one of the following fiber materials: three-dimensional weaves, unidirectional laminates and fiber mat. The filling elements can also be made of metallic material.

The fiber preform 200 equipped with the filling elements 217 to 220 is placed in an injection tool 400 similar to the tool 300 already described, i.e. comprising a first shell 410 comprising at its center a first cavity 411 corresponding in part to the shape and dimensions of the blade to be produced and a second shell 420 comprising at its center a second cavity 421 corresponding in part to the shape and dimensions of the blade to be produced.

Once the tool 400 is closed as illustrated on FIG. 8, the blade is molded by impregnating the preform 200 with a thermosetting resin that is polymerized by heat treatment. For this purpose the well-known process of injection or transfer molding, so-called RTM (Resin Transfer Molding) is used. In accordance with the RTM process, a resin 460, for example a thermosetting resin, is injected via the injection port 413 of the first shell 410, into the internal volume occupied by the preform 400. The port 423 of the second shell 420 is connected to an evacuation duct kept under pressure (not shown on FIG. 5). This configuration allows the establishment of a pressure gradient between the lower part of the preform 200 where the resin is injected and the upper part of the preform located near the port 423. In this way, the resin 460 injected substantially at the level of the lower part of the preform will gradually impregnate the entire preform by circulating through it all the way to the evacuation port 423 through which the surplus is evacuated. Of course, the first and second shells 410 and 420 of the tool may respectively comprise several injection ports and several evacuation ports. Once the resin has been injected into the entire reinforcement, it is polymerized by heat treatment in accordance with the RTM process by means of the upper 450 and lower 440 parts of the tool 300 which are equipped with heating means (not shown on FIG. 7).

After the injection and polymerization, the blade is unmolded and then trimmed to remove the excess resin and the chamfers are machined. No other machining is necessary since, the part being molded, it complies with the required dimensions.

As previously described, it is thus possible to produce, from the fiber preform of the invention, mainly blades or propeller airfoils made of organic matrix composite (OMC), carbon matrix (C/C) and ceramic matrix composite (CMC) material.

As illustrated on FIG. 9, a blade 20 is obtained, formed of a fiber reinforcement densified by a matrix which includes in its lower part a root 22 formed by the root preform part 212 of the fiber preform 200 and an airfoil 21 formed by the airfoil preform part 211 of the fiber preform 200. The blade 20 includes a leading edge 21a and a trailing edge 21b respectively corresponding to the leading edge 211a and trailing edge 211b parts of the fiber preform 200. The root 22 has a bulb shape and here comprises a skeleton with four branches 23 to 26 in which the branches 213 to 216 of the root preform part 212 respectively extend with the filling elements 217 to 220 located between the branches 23 to 26. If the filling elements are composed of a fiber material, the filling elements are also infiltrated by the resin injected into the tool and secured to the branches 213 to 216 of the root preform part 212 by co-densification. If the filling elements are composed of a metallic material, the filling elements are bonded to the branches 23 to 26 during the polymerization of the resin injected into the tool or after polymerization. An adhesive can moreover be deposited on the surface in contact with the filling elements 217 to 220 with the branches 213 to 216 of the root preform part 212. The blade 20 thus comprises a root 22 which has an axisymmetric compact shape suitable for incorporation into a rotation or propeller pitch change system.

The manufacturing method according to this invention can in particular be used to produce turbomachine blades having a more complex geometry than the blades shown on FIGS. 6 and 9.

The invention claimed is:

1. A method for manufacturing a turboprop engine blade or propeller airfoil made of composite material comprising a fiber reinforcement densified by a matrix, the method comprising:

producing by three-dimensional weaving of a fiber blank made as a single piece, the fiber blank having a flat shape extending along a longitudinal direction and a transverse direction respectively corresponding to a span direction and to a chord direction of the blade or propeller airfoil to be manufactured, the fiber blank comprising a root part and an aerodynamic profile part extending along the longitudinal direction from the root part and along the transverse direction between a leading edge portion and a trailing edge portion, shaping of the fiber blank to obtain a fiber preform as a single piece having said aerodynamic profile part forming an aerodynamic profile preform part and said root part forming a root preform part, and densifying the fiber preform by a matrix to obtain the blade or propeller airfoil made of composite material having a fiber reinforcement consisting of the fiber preform and densified by the matrix, and forming a single piece with an integrated root, wherein the root part of the fiber blank comprises several non-interlinkings extending along a plane parallel to a surface of the fiber blank, each non-interlinking extends in the transverse direction from an edge of the root part of the fiber blank and over a distance less than half the width of the root part, each non-interlinking separating two woven portions in the fiber blank and wherein the shaping of the fiber blank comprises orientation in different directions of the two woven portions separated by the non-interlinkings in such a way as to form the root preform part including a plurality of branches.

2. The method as claimed in claim 1, wherein the densification of the fiber preform comprises placing of the fiber preform in an injection tool having a shape of the blade or propeller airfoil to be manufactured, removable insertion elements being placed between the plurality of branches of the root preform part, the densification further comprising injection of a resin into the fiber preform held in the injection tool, transformation of the resin into a matrix by heat treatment and unmolding of the blade or propeller airfoil, the unmolding comprising removal of the removable insertion elements in such a way as to obtain a root with the plurality of branches.

3. The method as claimed in claim 1, wherein the densification of the fiber preform comprises placing of the fiber preform in an injection tool having a shape of the blade or propeller airfoil to be manufactured, filling elements being placed between the plurality of branches of the root preform part, the densification further comprising injection of a resin into the fiber preform held in the injection tool, transformation of the resin into a matrix by heat treatment and unmolding of the blade or propeller airfoil in such a way as to obtain a root comprising a skeleton formed of the plurality of branches with the filling elements bonded between the plurality of branches of said skeleton.

4. The method as claimed in claim 3, wherein the filling elements are composed of a fiber material chosen from among one of the following fiber materials: three-dimensional weaves, unidirectional laminates and fiber mat.

5. The method as claimed in claim 3, wherein the filling elements are made of metallic material.

6. A turboprop engine blade or propeller airfoil for an impeller made of composite material comprising a fiber reinforcement densified by a matrix, said turboprop engine blade or propeller airfoil being obtained according to the method for manufacturing a turboprop engine blade or propeller airfoil as claimed in claim 1, the blade or propeller airfoil including, along a span direction, a root and an aerodynamic profile, the fiber reinforcement comprising the fiber preform having a three-dimensional weave with the root preform part located in the root and the aerodynamic profile preform part located in the aerodynamic profile, the root and aerodynamic profile preform parts being connected to one another by three-dimensional weaving, wherein the root comprises the plurality of branches and in that the root preform part of the fiber preform comprises the plurality of branches each extending in a branch of the root.

7. An aeronautical engine comprising a plurality of blades or propeller airfoils as claimed in claim 6.

8. An aircraft comprising at least one engine as claimed in claim 7.

9. A turboprop engine blade or propeller airfoil made of composite material comprising a fiber reinforcement densified by a matrix, said turboprop engine blade or propeller airfoil being obtained according to the method for manufacturing a turboprop engine blade or propeller airfoil as claimed in claim 1, the blade or propeller airfoil including, along a span direction, a root and an aerodynamic profile, the fiber reinforcement comprising the fiber preform having a three-dimensional weave with the root preform part located in the root and the aerodynamic profile preform part located in the aerodynamic profile, the root and aerodynamic profile preform parts being connected to one another by three-dimensional weaving, wherein the root has a bulb shape, said root comprising a skeleton including the plurality of branches with filling elements located between the plurality of branches and in that the root preform part of the fiber preform comprises the plurality of branches each extending in a branch of the skeleton of the root.

10. The blade or propeller airfoil as claimed in claim 9, wherein the filling elements are composed of a fiber material chosen from among the following fiber materials: three-dimensional weaves, unidirectional laminates and fiber mats.

11. The blade or propeller airfoil as claimed in claim 9, wherein the filling elements are made of metallic material.

* * * * *